July 28, 1959  J. D. SAUTER  2,897,370
LOOP CONTROL WITH PHOTOTUBES
Filed April 16, 1956  3 Sheets-Sheet 1

INVENTOR.
BY John D. Sauter
Harry R. Campbell
Attorney

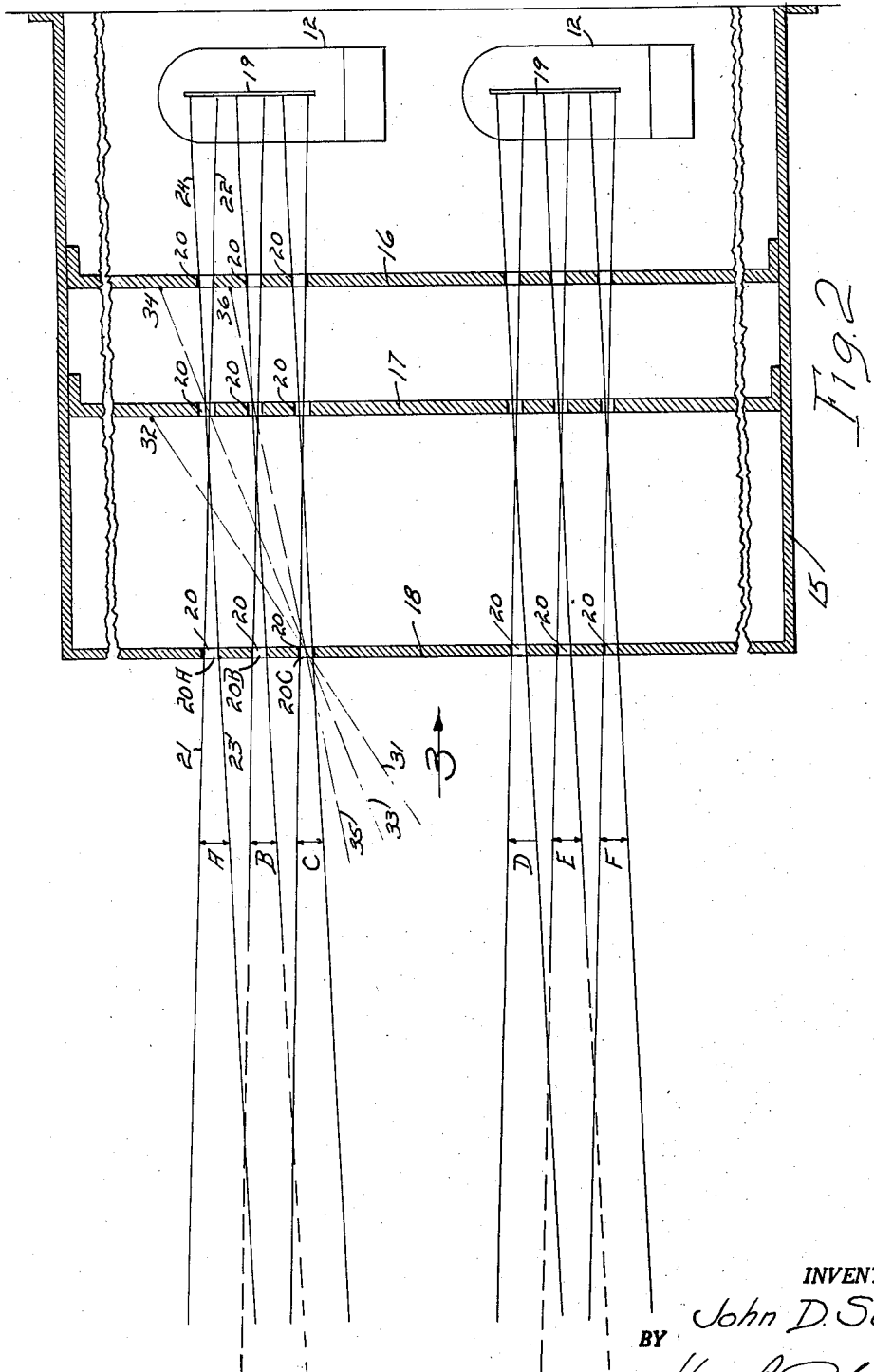

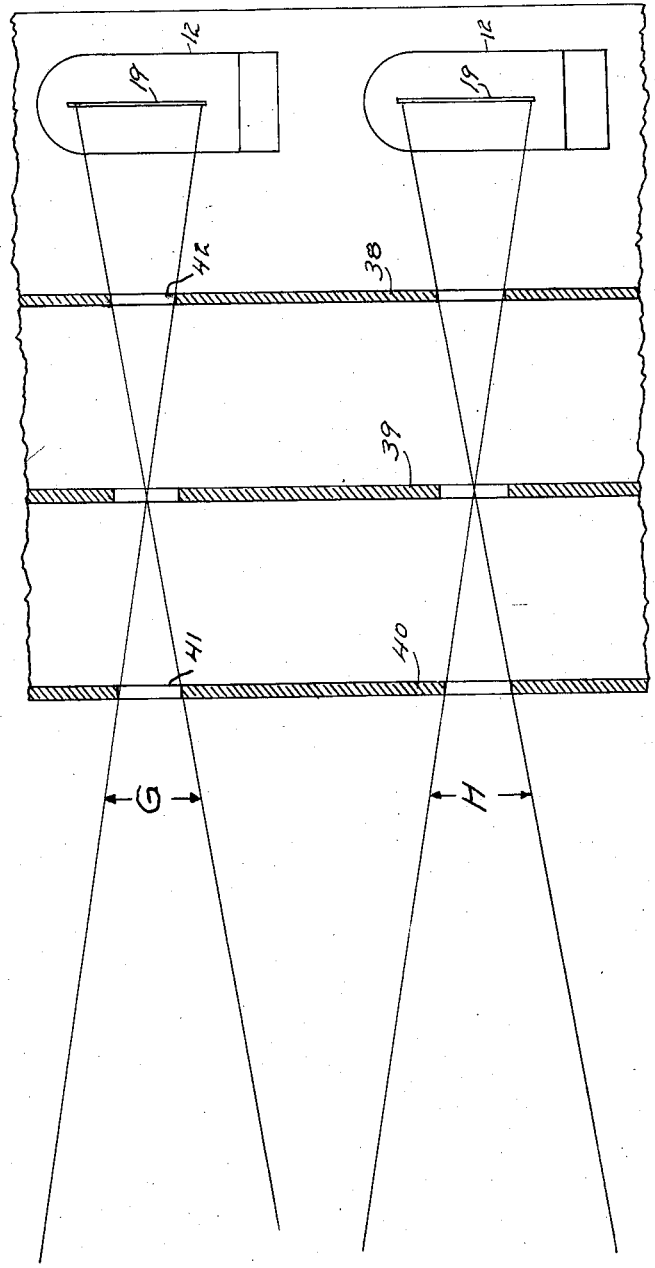

United States Patent Office

2,897,370
Patented July 28, 1959

2,897,370

LOOP CONTROL WITH PHOTOTUBES

John D. Sauter, Lyndhurst, Ohio, assignor to The Clark Controller Company, Cleveland, Ohio, a corporation of Ohio Application April 16, 1956, Serial No. 578,429

6 Claims. (Cl. 250—219)

This invention relates to electric control systems of the class in which control current is produced in light sensitive or photo-electric tubes, when illuminated by a source of light; and an opaque light-barrier is interposed between the source and the tubes; and the barrier is moved to vary the illumination of the tubes; and the tubes correspondingly vary the control current in response to the variable illumination.

While the invention has uses in various arts, one of its most important uses is in connection with the longitudinal propulsion of a strip of material by a motor, when the strip speed is to be maintained constant by controlling the speed of the motor in response to tendencies of the strip speed to vary.

In a well known type of such strip speed control system, a depending standing-loop is maintained in the moving strip, and the loop is disposed between a bank of photo-electric tubes and a bank of lamps for illuminating the tubes.

The strip, for simplification is here considered as entering the loop at constant speed and is to be maintained at constant speed by a motor as it leaves the loop. Any variation of speed of the strip going from the loop, causes an increase or decrease in the length of the loop, and causes it to intercept and cut off more or less of the lamp light from the tubes, and correspondingly decrease or increase their electrical output.

The output of the photo tubes actuates an electric motor control, to increase or decrease the speed of the motor propelling the strip, to correct the departure of strip speed from the desired constant value.

The present invention relates generally to systems of this type, sometimes referred to as loop-control systems.

There are certain principles of construction and function in loop-control systems as here defined which must be present for satisfactory operation, some of which are described below, and their absence has rendered prior systems inaccurate and generally unsatisfactory.

In a loop-control system as here defined, if the speed is to be maintained accurately constant, the illumination of the photo tubes must vary accurately with variations of the length of the loop, and to this end, the illuminating light must come from a stationary source; and in fixed predetermined direction, and of constant intensity at the source.

Light from a bank of lamps, having these characteristics can readily be provided, but accurate control of the light on the tubes by the loop is, in prior systems, vitiated by incidental or extraneous light that falls on the photo-tubes from sources other than the bank of lamps.

For example, the loop usually hangs in a pit, with the lamps and tubes at opposite sides and the pit may be as deep as 90 feet or more. Workmen must inspect the pit and the loop in it from time to time, by means of a portable spot-lamp; or as is sometimes desirable, permanent lamps are installed at the mouth of the pit or in the pit, to enable ready inspection; and light from such lamps may fall directly on the photo-tubes or be reflected upon them from the loop.

Again, the loop and pit may be located so that a traveling bridge crane passes over it, and the crane may carry lamps for its own uses, the light from which may variably and intermittently fall upon the photo-tubes.

Again, since the bank of commercial photo-tubes as are commonly used will be discontinuous in a series, then in the absence of countervailing provisions, the changes of length of the loop will make abrupt changes in the photo-tube current as the loop exposes each successive tube to the light or blocks off light from the tubes successively; resulting in abrupt changes of the current and abrupt changes of the controlled motor speed.

The general object of the invention is to provide a loop control system in which objections to prior systems as mentioned above are obviated.

Another object of the invention is to provide a photo-electric control as defined above comprising a photo-tube, and means to cause it to respond to light travelling toward the tube from a given source of light, and to be non-responsive to light travelling toward the tube from any other source.

Another object is to provide a photo-electric control comprising a photo-tube and a source of light, and screening means through which light from the source may flow and illuminate the tube and which blocks off from the tube, light from other sources.

Another object is to provide a photo-electric loop control as defined above comprising a source of light and a photo tube having a light sensitive element and a loop of changing length to cut off the source light from the tube element, and improved means to cause the cut off of light from the element to vary gradually with gradual changes of loop length.

Another object is to provide a loop control as defined above comprising a source of light for illuminating the sensitive elements of a discontinuous bank of individual photo-tubes, and a loop of changing length to cut off the source light from the tubes successively, and improved means to cause the cut off of light at successive tubes to occur gradually with gradual changes of loop length.

With these objects in view, and others which will occur to those skilled in the art, the invention as hereinafter fully described, comprises in general the following; the actual invention being that set forth in the appended claims.

A vertical bank of illuminating lamps is spaced from a vertical bank of individual spaced photo tubes, in a loop control system as defined hereinbefore.

Adjacent to the photo tubes and between the tubes and the loop are a number of screens, preferably of opaque sheet material and three in number, parallel to each other and parallel to the bank of tubes.

In horizontal alignment with the light sensitive element or plate of each photo tube, the screens have windows therethrough, making a set of three windows aligned with each tube.

In the preferred form of the invention these windows each consist of a group of small round holes, for example nine holes, arranged in a symmetrical rectangular pattern, providing three vertical series of three holes each.

Each hole of the pattern in one screen is horizontally aligned with a hole in a like pattern of each of the other screens.

In general the light from the lamp bank passes through the holes and activates the light sensitive elements of the tubes and is variably intercepted as the loop lengthens and shortens, as in the premises hereof.

The bank of lamps provides a vertically continuous source of light. Considering any one of the tubes, say the middle one of the vertical bank, and light can go horizontally from the source through the window holes and illuminate the light sensitive plate of the tube, and due to the said pattern of the holes, will illuminate nine spot areas on the plate.

As will appear hereinafter, the light entering each proximal hole of the pattern from the source, comes in a converging cone, and from a large area of the source because of the distance away of the light source. While these several light cones are separate near the holes, they overlap or intermingle between the holes and the light source, that is, in the space in which the loop end rises and falls.

The loop end therefore moves, for example, descends, through these cones of light, at points where they are of large diameter, and since an entire cone of light must be intercepted before the corresponding spot of light on the photo tube plate is extinguished, it follows that the illumination of each spot will be varied gradually by movement of the loop end.

Also, since all of the cones coming to the vertically spaced holes of the pattern must be successively intercepted to extinguish all of the spots of light on the tube plate, it follows that the illumination of the tube plate as a whole will be cut off gradually.

The photo tubes, when commercial tubes are used as is preferable, and when placed in a vertical series as contemplated, will have their light sensitive plates spaced apart vertically a considerable distance, for example several inches. The patterns of holes constituting the said windows in each screen will therefore be spaced apart vertically like distances. The group of said cones of light entering one window, will be separate vertically from the group of cones entering a window above or below it. But again, due to the distance of the light source from the holes, the light cones of all of the windows merge or overlap at parts thereof of large diameter where the loop intercepts them, so that the change of illumination on the successive plates of successive tubes is gradual.

The above described gradual action would be obtained with only two screens and aligned windows therein, but then it would be possible for extraneous light, as defined hereinbefore, and coming from a source outside the said light cones, to enter one of the lower holes of the pattern of the forward screen, and pass at an inclination through a higher hole in the pattern of the rearward screen and fall upon the tube plate. By interposing a screen and window holes between the forward and rearward screens, the passage of light from the cones to the tubes is not interfered with; and any extraneous light passing the first screen will be intercepted by the solid material of the intermediate screen at a point between the windows therein.

Instead of the particular preferred pattern of round holes constituting the windows referred to above, the holes may be of other shapes, and arranged in other patterns; or they may be in the form of slots; or in some cases a single hole instead of a group or pattern of holes may be utilized.

An embodiment of the invention is fully disclosed in the following description taken in connection with the accompanying drawing, in which:

Fig. 2 is a view to full scale of a part of Fig. 1 in section on a vertical plane, with parts broken away; and the view may be referred to the plane 2—2 of Fig. 3; the view showing two photo-tubes of Fig. 1 and light beams going thereto;

Fig. 6 is a view similar to Fig. 2 showing a modification.

Figure 1:
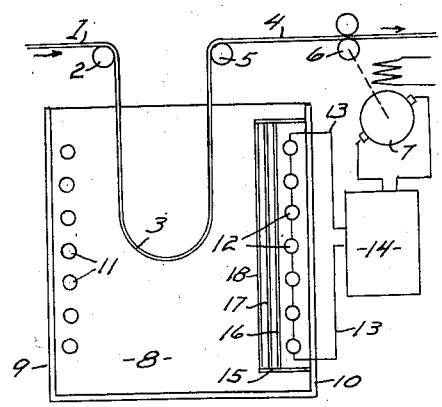
Fig. 1 is a diagrammatic view of a loop control system and with the invention hereof incorporated therein in diagrammatic form.

Referring to the drawing Fig. 1, which illustrates diagrammatically the principal parts of an embodiment of the invention, there is shown at 1 a strip of material, which for the purpose of simplifying the disclosure is assumed to be moving toward the right at constant speed, from a process, for example, mill rolls; and going over a roll 2, into a depending loop 3, and withdrawn toward the right from the loop as at 4 over a roll 5, by rolls 6 driven by a motor 7.

The loop 3 depends into a pit 8 between side walls 9–10 of the pit.

A vertical bank of lamps, 11, and a vertical bank of photo-tubes 12, are provided adjacent respectively to the walls 9—10 and therefore on opposite sides of the loop 3.

Light form the lamps 11 falls on the tubes 12 and energizes them to produce electric current in a circuit indicated at 13 going to a controller 14 for the motor 7.

The loop 3, intercepts some of the light going to the tubes.

Any decrease in speed of the strip at 4 will cause the loop 3 to become longer and intercept more light and correspondingly decrease the control current in the circuit 13; and the controller 14 is made to respond thereto and correspondingly speed up the motor and cause it to speed up the strip and restore it to its original constant speed. The reverse operation occurs if the strip 4 should increase in speed. The strip at 4 is thus maintained at constant speed.

This much of the disclosure will be recognized as being similar to known types of loop-controls, as defined hereinbefore.

Figure 3:
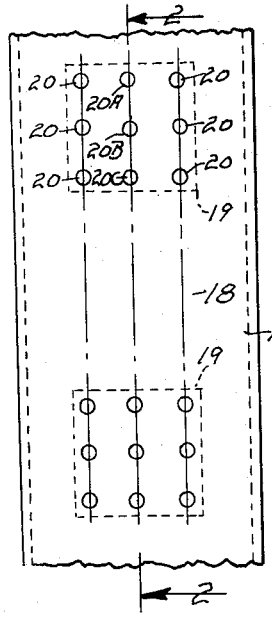
Fig. 3 is an elevational view taken in the direction of the arrow 3 of Fig. 2, with parts broken away.

Supported at the side 10 of the pit is a box 15, see Figs. 2 and 3, which may be of sheet metal, containing and supporting the photo-tubes 12 in vertical equally spaced alignment.

Immediately in front of the tubes 12 the box has three sheet metal vertical walls or screens 16—17—18, parallel to the tubes and to each other, and the wall 18 may be the front wall of the box.

In Figs. 2 and 3 the tubes 12 are shown as having light sensitive plates 19.

In order to make this disclosure an illustrative example of an actual installation of the invention, utilizing commercial photo-tubes, the tube plates 19 are shown in Figs. 2 and 3 as about ¾" square; and their centers 3½" apart vertically; the wall 16 at 1½" from the plates; the walls 16 and 17 spaced apart 1"; and the walls 17 and 18 spaced apart 2".

In horizontal alignment with each of the photo-tube plates 19, each of the walls, 16—17—18 has a group of nine holes 20 therethrough, arranged in preferably a rectangular pattern, see Fig. 3, the center hole being coaxial with the center of the photo-tube plate and the others disposed around it symmetrically; and the dimensions of the rectangular pattern being somewhat less than the ¾" square dimensions of the plate.

The holes 20, in the illustrative example are ⅛" round holes.

Light from the bank of lamps 11, Fig. 1 going across the pit 8, goes, in general, through the holes 20 and illuminates the tube plates, but in the particular manner constituting part of the invention.

The three groups of aligned holes 20 in the walls 16—17—18 may be referred to collectively hereinafter as three windows; and the walls 16—17—18 themselves as light screens.

Referring to the upper part of Fig. 2 is will be obvious that light from the source 11, Fig. 1 coming horizontally to the screen 18, can flow in cylindrical pencils of light through aligned ⅛" holes 20 of the three windows and illuminate spots on the tube plate 19. But as shown in Fig. 2 more light than this can pass the ⅛" holes. Light can enter a hole 20, in the screen 18, say the upper hole 20 designated 20A, and flow along the upper side of the hole in the downwardly inclined direction indicated by the line 21, and go on through the second hole 20 in the screen 17 and emerge at the lower side of third hole 20 of the screen 16 along the line 22; and similarly light can enter the hole 20A at its lower side in the upwardly inclined direction of the line 23 and emerge from the third hole 20 at its upper side along the line 24. The total light entering the ⅛" round hole 20A and illuminating a portion of the tube plate 19 is therefore in the form of a conical beam A defined by the lines 21—23; and incidentally, due to the divergence of the lines 24—22, it illuminates a spot on the plate 19 greater than ⅛" diameter.

In Fig. 2, there will be similar conical beams B and C supplying light through the holes designated 20B and 20C respectively, the beam B being extended in dash lines for clarification.

The beams A, B, C, correspond to the three holes 20A, 20B, 20C, Figs 2 and 3, which are in a vertical series on the vertical center line of the window as a whole; and there will therefore be a total of nine similar beams, coming to the nine holes of the upper window of Figs. 2 and 3 as will be understood.

The lower window of Figs. 2 and 3 will also have nine beams coming to it, three of which are shown at D, E, F, in Fig. 2, as will be understood.

In the illustrative example here considered, and with reference to Fig. 1, the distance from the front screen 18 across the pit to the light source 11 is taken as 25 feet.

By geometry it may be readily shown that a cone of light such as the cone A above described will have a base in the source of light about 2 feet in diameter.

As shown in Fig. 2, at a short distance of a few inches from the front screen 18, the said cones A, B and C begin to overlap or intermingle, and this condition continues all the way therebeyond to the light source.

Figure 4:
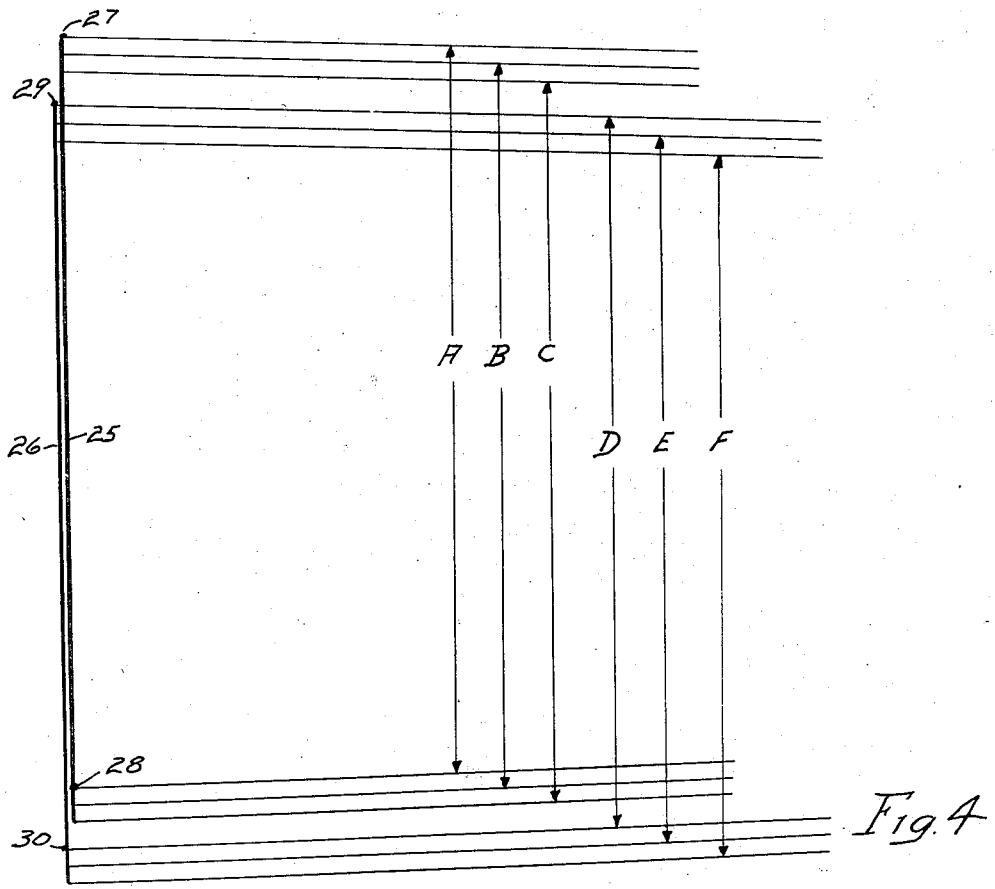
Fig. 4 is a somewhat diagrammatic view of a light source and beams of light emanating therefrom, the said beams appearing also in Fig. 2.

The beams A, B, C and D, E, F, when extended to the light source, appear as in Fig. 4.

In Fig. 4 portions of the light source are indicated by the heavy lines 25 and 26. The portion of the light source constituting the 24" base of the cone A is that between the points 27 and 28, on the line 25, drawn to about ¼ full scale, or approximately 6" long.

Similarly the portion of the light source constituting the 24" base of the cone D is that between the points 29 and 30 on the line 26 drawn to the same reduced scale.

The overlapping and intermingling of the beams A to F is apparent in Fig. 4.

In the full equipment of the illustrative example, there will of course be a set of light cones like A, B, C, and D, E, F, for each of the photo tubes in their vertical series.

If all of these sets of cones were shown in Fig. 4 the drawing would be too complex to be legible; but it is believed to be clear in view of what is shown in Fig. 4, that the space between the full vertical length of the light source and the full vertical length of the series of tubes, will be filled with light cones (of which the cones A to F are examples) all the way from the light source to within a few inches of the front screen 18.

It is in this space that the loop moves, and, as it descends for example, it cuts into and down through the bodies of the cones successively; taking up successive positions in each; and may be just entering and intercepting the top of one cone and at the same time intercepting a large part of another, and also just finishing complete interception of another.

The result is a gradual downward interception of the light passing through the window holes, and illuminating the individual tube plates, and the plates of successive tubes and a gradual reduction of plate current in the series of tubes for the purposes of the premises.

As to the blocking off of extraneous light, as referred to, reference may be had to Fig. 2.

Extraneous light would of course be light coming toward the front screen 18 from outside the said cones of light, A, B, C, for example. Such light, for example that represented in general direction by the line 31, might pass through the hole 20C, of the first screen 18, but would be intercepted by the solid part of the screen 17, at the point 32; or if light came in the direction of the line 33 it might pass through the hole 20C of the screen 18, and the top hole 20 of the screen 17 but would be intercepted by the screen 16 at the point 34; or might come in the direction of the line 35 and pass through the hole 20C and through the middle hole 20 of the screen 17 but would be intercepted on the screen 16 at the point 36.

From an inspection of Fig. 3 it will be seen that extraneous light coming at any angle from the side of the box instead of from in front of it as just discussed and passing through any hole 20 in the forward screen 18, would be intercepted by the other side of the box.

Thus all extraneous light will be intercepted and never reach the tube plates.

While the preferred form as stated is one comprising windows in the screens consisting of nine small round holes, this is not essential as will be apparent. Any other shape and any other number of holes may be used which will direct light from the source in tapering beams through the screens to the tube plates.

Figure 5:
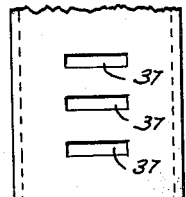
Fig. 5 is a fragmentary view of a part of Fig. 3 showing a modification.

For example, horizontal slots may be used as indicated at 37 in Fig. 5 in which case the beams would be wedge shaped but appearing as in Fig. 2 as will be understood.

The foregoing, as will be seen, presupposes that the light source, horizontally opposite to the photo-tubes, and shown diagrammatically in Fig. 1 as comprising a series of individual lamps 11 will be one that in effect, emits light as if it came horizontally from a vertically continuous source; and this effect may be obtained in a well known manner, by spacing the lamps suitably close together; or by utilizing lamps of vertical tube form; and as illustrating that the light source is of this character, portions of it have been shown in Fig. 4 as represented by the vertically continuous lines 25 and 26.

The electric circuit of the photo-tubes has been shown in Fig. 1 as a simple series circuit; but this is for simplification of the diagram, it being well known that the tubes may be connected in parallel or series-parallel arrangement.

In Fig. 2, the screens 16—17 and 18 and the tubes 12 are so spaced horizontally that the beams of light fall on separated spots on the sensitive elements 19 of the tubes.

By spacing the tubes farther from the screen 16, the spots would be larger; but without gain in the developed amperage, since, within the capacity limits of such tubes, the output is a matter of lumens, on the sensitive element, and the lumens reaching the tube would not be changed but merely dispersed by moving the tubes farther back.

While there are advantages in having the windows in the screens composed each of a number of small holes as described, the invention is comprehensive of single-hole windows, and this form of the invention will now be considered in connection with Fig. 6.

In Fig. 6, to make a simplified comparison with the form of Fig. 2, the horizontal spacing of the walls, here 38—39—40, and of the sensitive elements 19 of the tubes; and the size of the sensitive elements, has been shown the same in general as in Fig. 2, except that the wall 39 is midway between walls 38 and 40.

In view of the full description of Figs. 2 and 4 it will be clear that in order for the whole area of the sensitive tube element 19 to be illuminated, light must pass through aligned holes such as 41 and 42 in the screens 40 and 38 from a conical beam such as G, and this predetermines a diameter for the holes 41 and 42, of about ½".

Since there is a bank of tubes, one-hole windows must be provided for each of the individual tubes; and there will accordingly be a corresponding number of beams, the next below the beam G being shown in Fig. 6 at H.

The cone angle of the beam G is more obtuse than that of the beams A to F of Fig. 2: and with the light source again 25' away as for the form of Fig. 2, and with the holes ½" instead of ⅛" diameter as for Fig. 2, the cone base, as can readily be shown by geometry, will be 8' in diameter, instead of 2' as for the form of Fig. 2.

The cones G and H of Fig. 6, proceeding toward the light source, will overlap and intermingle and have in general the same relation as the cones A and D of Fig. 4, and the whole space between the light source and a point a few inches forwardly of the front screen 40, in which the loop moves, will be filled with such cones.

Movement of the loop in this space will gradually change the illumination on the sensitive elements 19 of the tubes.

The illumination of the tubes does not change as sensitively with movement of the loop end as it does in the form of Figs. 2 to 4, for the following reason, although it will be sensitive enough for satisfactory results in many cases.

The loop may, for convenience, be considered as moving (descending) into the mass of light cones at a point midway between the light source and the front screen 40; and at such point, since the base of any cone is about 8 feet vertically, the loop will have to move 4' from the time it first enters the side of a cone such as G until it completely cuts it off.

In the form of Figs. 2 to 4, the cone base is only 2' in diameter and the mid point at which the loop cuts it is therefore only 1' deep, and the loop needs to move only 1' to similarly completely cut off a group of beams, such as A, B, C.

Thus the change of illumination of any one tube from full on to completely off requires a loop movement of only 1' with the form of Figs. 2 to 4; but requires a like movement of 4' with the form of Fig. 6, and the regulation of the motor speed for constant strip of the premises will be more sensitive to loop movements in the former case than in the latter.

It has been found that the blocking off of extraneous light from the tubes, with the plural hole windows of Fig. 2, is better effected when the middle screen 17 is closer to the rearward screen 16 than to the forward screen 18, a satisfactory position being that described and illustrated. With the form of Fig. 6 this middle screen 39 has a greater range of effective blocking off positions and may be half way between the screens 39 and 40 as illustrated; the blocking off action occurring in a manner similar to that described for Fig. 2 and needing no further description.

In the foregoing the windows are illustrated and described as composed of open holes in the walls 16—17—18 Fig. 2 or 38—39—40 of Fig. 6.

It may be desirable to seal off these holes from the surrounding air to prevent accumulation of dirt therein, and in the case of the most forward holes in the wall 40 or the wall 18, to keep dust and dirt out of the box 15. To this end each hole may be sealed with a cover mounted on the wall and covering the hole in any suitable manner and made of transparent material so as not to interfere with the passage of light through the hole.

I claim:

1. In a control apparatus, a vertically extending source of light; a photo tube having a vertically extending light sensitive element; a first, second and third vertical wall of opaque material, spaced apart and substantially parallel, and between the photo tube and the light source, the third wall being spaced from the photo tube; a depending loop of opaque sheet material between the light source and the first wall; means causing the loop to lengthen and shorten; first, second and third windows in a horizontal series in the respective first, second and third walls, comprising each a hole through the wall, the holes being of substantially of the same size, and smaller than the sensitive element of the photo tube and horizontally aligned with each other and with the sensitive element; the walls being spaced apart so that a conical beam of light from the source may enter the first hole along the upper edge thereof and emerge along the lower edge of the third hole, and enter along the lower edge of the first hole and emerge along the upper edge of the third hole, the emerging beam impinging on and illuminating the sensitive element; the beam passing freely through the second hole; and the light source and the loop being spaced from the first wall far enough so that the conical beam is of substantial vertical thickness and will be gradually intercepted by the loop when it lengthens, and gradually reduce the illumination of the sensitive element.

2. In a control apparatus, a vertically extending source of light, a series of vertically spaced photo tubes each having a vertically extending light sensitive element; a first, second and third vertical wall of opaque material spaced apart and substantially parallel and between the tubes and the light source, the third wall being spaced from the photo tubes; a depending loop of opaque sheet material between the light source and the first wall; means causing the loop to lengthen and shorten; a plurality of vertically spaced parallel series of first, second and third windows in the respective walls each series in horizontal alignment with one of the sensitive elements; the windows comprising each a hole through the wall; the holes being of substantially of the same size, and smaller than the light sensitive element; the walls being spaced apart so that conical beams of light from the source may enter the first holes of several series along the upper edges of the holes and emerge along the lower edges of the third holes, and enter along the lower edges of the first holes and emerge along the upper edges of the third holes, each emerging beam impinging on and illuminating a respective sensitive element; the beams passing freely through the second holes; the light source and the loop being spaced from the first wall far enough so that the conical beams overlap and intermingle and will be successively gradually intercepted by the loop when it lengths and thereby gradually reduce the illumination of each of the sensitive elements successively, and thereby gradually reduce the illumination of the series of sensitive elements progressively.

3. A control apparatus as described in claim 1 and in which the windows comprise each a plurality of holes through the wall, the holes being vertically and laterally spaced apart and disposed in alike patterns in each wall, the outline of the patterns being substantially of the same size as the sensitive element of the tube; and in which conical beams of light from the source enter the respective holes of the first window and emerge from corresponding holes of the third window and illuminate spots on the sensitive element, the beams passing freely through holes in the second window; and the light source and loop being spaced from the first wall far enough so that the several conical beams overlap and intermingle and will be gradually, successively intercepted by the loop when it lengthens, and thereby successively cut off illumination of spots on the sensitive element.

4. A control apparatus as described in claim 2 and in which the windows comprise each a plurality of holes through the wall, the holes being vertically and laterally spaced apart and disposed in alike patterns in each wall, the outline of the pattern being substantially of the same size as the sensitive element; each hole in each pattern aligned with a hole in the other patterns; and a conical beam of light from the source enters each of the holes of the several windows of the first wall and passes freely through the holes of the second wall, and emerges from each of the holes of the several windows of the third wall and illuminates spots on the respective sensitive elements; and all of the beams overlapping and intermingling whereby the loop upon lowering will successively intercept the beams and thereby gradually reduce the illumination of the sensitive elements of each tube by cutting off light from said spots, and thereby gradually reduce the illumination of the series of sensitive elements, progressively.

5. A control apparatus as described in claim 3 and in which the distances of the second wall from the first and third walls are in the ratio of two to one.

6. A control apparatus as described in claim 4 and in which the distances of the second wall from the first and third walls are in the ratio of two to one.

References Cited in the file of this patent

UNITED STATES PATENTS

| | | |
|---|---|---|
| 1,939,215 | Kune | Dec. 12, 1933 |
| 1,949,184 | Robinson | Feb. 27, 1934 |
| 2,147,421 | Bendz | Feb. 14, 1939 |
| 2,295,327 | Bendz | Sept. 8, 1942 |
| 2,351,229 | Potts | June 13, 1944 |
| 2,379,132 | Cook | June 26, 1945 |
| 2,482,242 | Brustman | Sept. 20, 1949 |
| 2,547,201 | Fegely | Apr. 3, 1951 |
| 2,605,965 | Shepherd | Aug. 5, 1952 |

FOREIGN PATENTS

| | | |
|---|---|---|
| 480,223 | Canada | Jan. 15, 1952 |